United States Patent [19]

Jordan

[11] Patent Number: 5,011,167
[45] Date of Patent: Apr. 30, 1991

[54] CHUCK JAW
[75] Inventor: Paul T. Jordan, Seneca, S.C.
[73] Assignee: Jacobs Chuck Technology Corporation, Wilmington, Del.
[21] Appl. No.: 491,729
[22] Filed: Mar. 12, 1990
[51] Int. Cl.$^5$ .............................................. B23B 31/12
[52] U.S. Cl. ....................................... 279/62; 279/1 K
[58] Field of Search ..................................... 279/60–64, 279/123, 1 K, 114; 108/240

[56] References Cited

U.S. PATENT DOCUMENTS

| 725,273 | 4/1903 | McDonough | 279/60 |
| 2,615,721 | 10/1952 | Gridley | 279/60 |
| 3,927,892 | 12/1975 | Pradota | 279/62 |

FOREIGN PATENT DOCUMENTS

| 508937 | 1/1955 | Canada | 279/123 |
| 326104 | 9/1920 | Fed. Rep. of Germany | 279/123 |

Primary Examiner—Larry I. Schwartz
Assistant Examiner—Schultz
Attorney, Agent, or Firm—Robert R. Jackson

[57] ABSTRACT

The profiles of the threads on the jaws of a chuck, such as a three-jawed chuck, are modified so that at least one end of the jaw thread segments curve in away from the threads on the nut which operate the jaws. This prevents the end edges of the jaw thread segments from digging into the nut threads when the nut is rotated to operate the jaws.

6 Claims, 3 Drawing Sheets ic helix concentric with the longitudinal axis of the main body. This thread engages a thread segment on

CHUCK JAW

BACKGROUND OF THE INVENTION

This invention relates to jaws for chucks, and more particularly to the shape of the threads used on such jaws.

Chucks are widely used for releasably holding tools of various sizes (e.g., drill bits of various diameters) in the machinery (e.g., a drill press) which operates the tool. A very common type of chuck has (1) a main body, (2) three longitudinal jaws which are mounted in the main body so that they are equidistantly spaced about and inclined toward a longitudinal axis of the main body, and (3) a nut mounted on the main body for rotation about the longitudinal axis of the main body. The nut has an internal thread which forms a frustoconical helix concentric with the longitudinal axis of the main body. This thread engages a thread segment on each of the jaws so that rotation of the nut causes each jaw to move parallel to its longitudinal axis and therefore toward or away from the longitudinal axis of the main body, depending on the direction of rotation of the nut. In this way the jaws can be made to grip or release a tool (e.g., a drill bit) which is coaxial with the longitudinal axis of the main body.

A problem sometimes encountered with chucks of the foregoing type is that rotation of the nut applies a frictional force to the jaw threads which tends to cause each jaw to rotate about its longitudinal axis. Because the threads on the jaws are only thread segments, they have end edges which can dig into the threads on the nut when the jaws are thus rotated about their longitudinal axes. This resists or impedes further rotation of the nut, thereby interfering with smooth operation of the chuck and also possibly reducing the gripping force applied to the tool by the jaws. Although this effect may be noticeable in both directions of nut rotation, it tends to be a more serious problem when the nut is rotated in the tool chucking direction rather than in the tool unchucking direction because as the tool is gripped, the above-mentioned frictional force tending to rotate the jaws about their longitudinal axes increases.

In view of the foregoing, it is an object of this invention to improve chucks of the type described above.

It is a more particular object of this invention to provide improved configurations for the thread segments on chuck jaws of the type described above which reduce or eliminate the problem of edges digging into the threads on the associated chuck nut.

SUMMARY OF THE INVENTION

These and other objects of this invention are accomplished in accordance with the principles of the invention by providing chuck jaws having thread segments in which at least one of the end edge regions is curved inwardly away from the nut threads with a smaller radius than the radius used for the main portion of the thread segment so that when the jaw is rotated about its longitudinal axis, the end edges of the threads do not contact or dig into the nut thread. In other words, the rotation of each jaw about its longitudinal axis is stopped by contact between the nut threads and relatively extensive jaw surfaces (e.g., the smaller radius end edge portion of the jaw thread segments) rather than by contact between the nut threads and the relatively sharp jaw thread end edges themselves. Stopping jaw rotation by contact between nut thread and jaw thread surfaces promotes continued smooth operation of the chuck, as well as stronger and easier tool gripping, because it avoids the binding that can result from a jaw thread end edge digging into the nut thread.

Further features of the invention, its nature and various advantages will be more apparent from the accompanying drawings and the following detailed description of the invention.

DETAILED DESCRIPTION OF THE PREFERRED EMBODIMENTS

Figure 1:
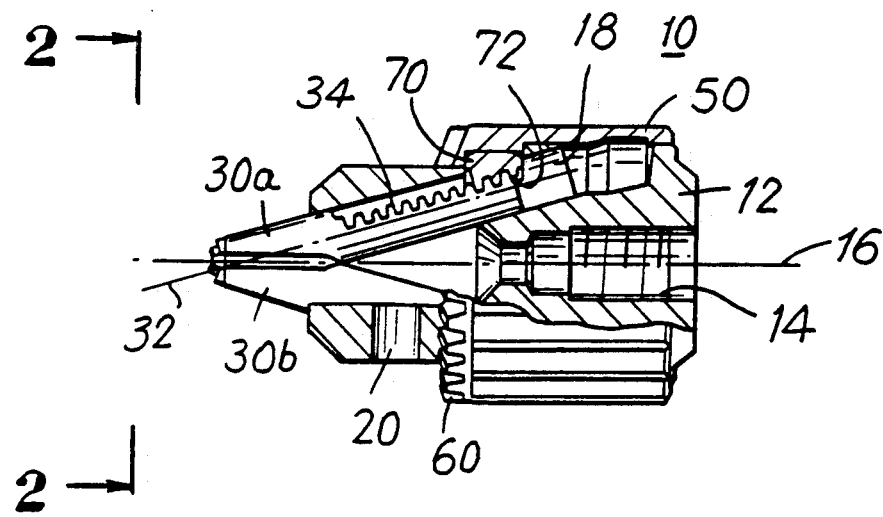
FIG. 1 is a side view, partly in section, of a chuck which may be constructed either as in the prior art or in accordance with this invention. The portions of FIG. 1 which are in section are taken along the line 1—1 in FIG. 2.
Figure 2:
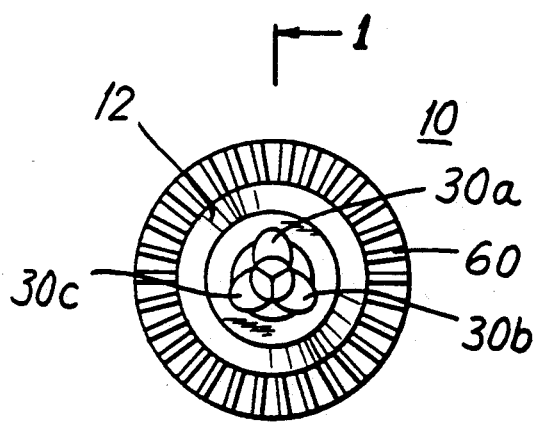
FIG. 2 is a front end view (taken along the line 2—2 in FIG. 1) of the chuck of FIG. 1.

As shown in FIGS. 1 and 2, a chuck 10 constructed in accordance with this invention (or the prior art) has a generally cylindrical main body 12 which is typically attached to a machine (not shown) via a machine shaft which extends into bore 14 in the rear of main body 12. The central longitudinal axis of main body 12 is identified by reference number 16.

Three jaws 30a, 30b, and 30c (sometimes collectively or generically referred to as jaw or jaws 30) are mounted in three bores 18 in main body 12. Each jaw 30 has a longitudinal axis typified by axis 32 in FIG. 1. Bores 18 are equidistantly spaced around axis 16 so that jaws 30 are also equidistantly spaced around that axis. In addition, bores 18 are inclined toward axis 16 and toward the front of main body 12 so that jaws 30 are similarly inclined. Each bore 18 guides the associated jaw 30 for motion parallel to its longitudinal axis 32.

Collar 50 is mounted on main body 12 for rotation relative to that body about axis 16. Collar 50 is joined to ring gear 60 and internally threaded nut 70. (In some designs elements 50 and 60 are fabricated as the same part, while in other designs elements 60 and 70 are fabricated as the same part.) Collar 50 can be rotated either by hand or by a pinion gear (not shown) mounted on a shaft (also not shown) which removably projects into bearing aperture 20 in main body 12 so that the teeth on the pinion mesh with the teeth on ring gear 60. Rotation of elements 50 and 60 rotates nut 70.

The threads 72 on nut 70 form a frustoconical helix concentric with axis 16. These threads mesh with thread segments 34 on each of jaws 30. Accordingly, rotation of nut 70 causes jaws 30 to move parallel to their longitudinal axes 32 toward or away from axis 16, depending on the direction of rotation of the nut. In this way jaws 30 can be made to grip or release a tool (not shown) located between the jaws and concentric with axis 16.

Figure 3:
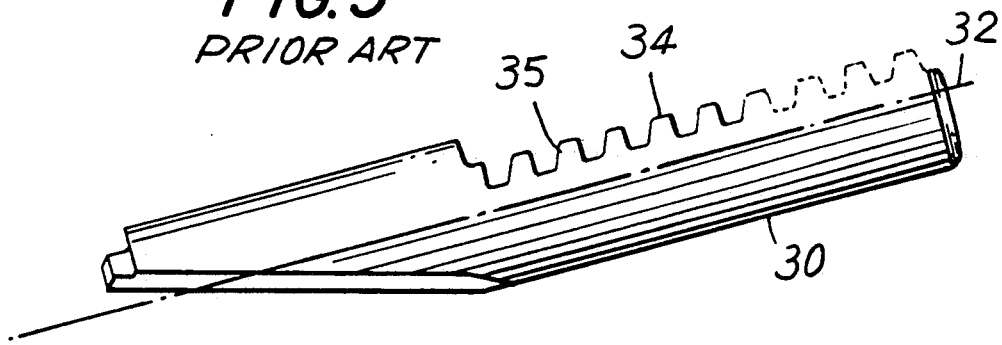
FIG. 3 is a side view, partly in section of a typical prior art jaw for use in the chuck of FIG. 1.
Figure 4:
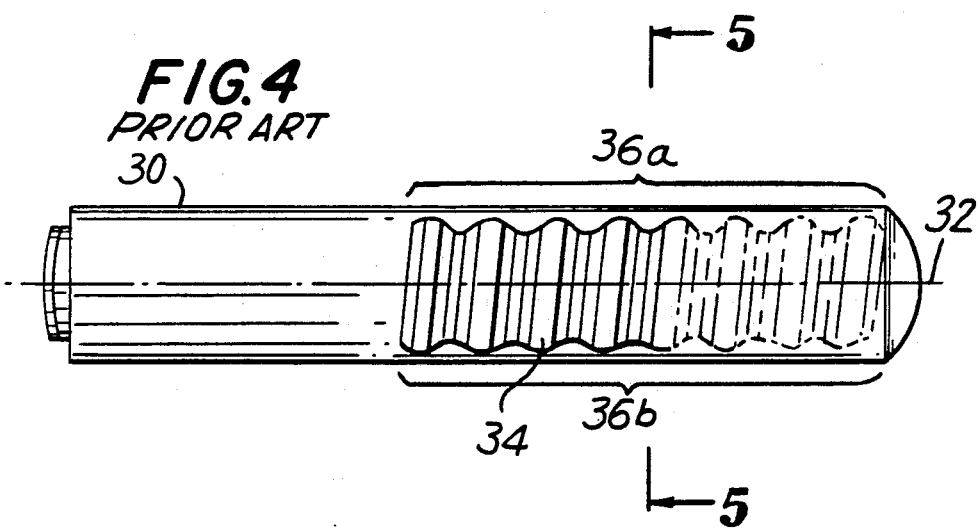
FIG. 4 is a view looking down on the jaw shown in FIG. 3.
Figure 5:
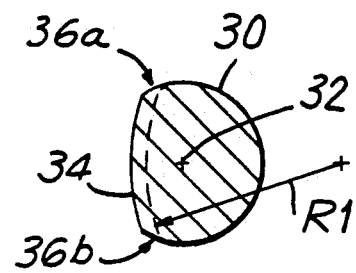
FIG. 5 is a sectional view taken along the line 5—5 in FIG. 4.

FIGS. 3-5 show a typical prior art jaw 30 in more detail. As can be seen in these FIGS., jaw thread segments 34 are typically arcuate with a radius R1 which is selected to complement the threads 72 on nut 70 with which thread segments 34 mesh. Because the radius of nut threads 72 decreases in the direction from the rear to the front of the nut, R1 may be selected to be approximately the average radius of threads 72 minus a suitable clearance dimension. Jaw thread segments 34 are also inclined as can best be seen in FIG. 4 in order to match the helical incline of threads 72.

The operation of chucks of the type described above is not always as smooth as would be desirable. Moreover, this lack of smoothness may interfere with tight gripping of a tool by the chuck. It is believed that this lack of smoothness may be due, at least in part, to the following: Rotation of nut 70 applies a frictional force to jaw threads 34 parallel to the mating surfaces of threads 34 and 72. This frictional force tends to rotate each jaw 30 about its longitudinal axis 32. This rotation stops when the leading end edge of threads 34 contacts opposing surfaces of threads 72. (The end edges of threads 34 are identified by reference numbers 36a and 36b in FIGS. 4 and 5. Depending on the direction of rotation of nut 70, one of these end edges will be the leading end edge (i.e., the end edge which leads threads 34 into threads 72), and the other end edge will be the trailing end edge.) Because these end edges are typically relatively sharp or abrupt, they tend to dig into threads 72 when jaws 30 are rotated about their longitudinal axes 32 as described above. This can produce an abrupt resistance to further rotation of nut 70. Nut 70 therefore does not rotate as smoothly as it should, and there may even be interference with tight gripping of the tool to be held by the chuck. Indeed, this problem may become most severe just as the tool is being gripped by the chuck because the resulting back-pressure on jaws 30 increases the above-mentioned friction between the mating faces of threads 34 and 72. This in turn increases the torque tending to rotate jaws 30 about their longitudinal axes 32, thereby causing leading end edge 36 to dig into threads 72 even more forcefully.

The foregoing problem is overcome in accordance with this invention by modifying the radius of the portion of threads 34 adjacent at least one of end edges 36. Although the invention will be shown and described as applied to both end edge regions, if the problem addressed by this invention is sufficiently troublesome only in one direction of nut rotation (e.g., in the chucking direction), it will be apparent that the invention can be applied to only the end edge portion which is the leading end edge when nut 70 is rotated in that direction.

Figure 6:
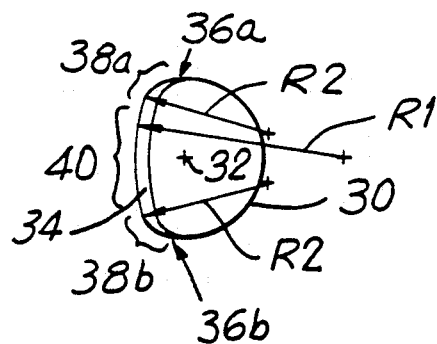
FIG. 6 is a view similar to FIG. 5 showing a first illustrative embodiment of this invention.

As shown, for example, in FIG. 6, the regions 38a and 38b of jaw threads 34 adjacent end edges 36a and 36b are modified in accordance with this invention so that they have a radius R2 which is less than R1 (similar to R1 in FIG. 5). In the preferred embodiments, the more sharply curved end edge regions 38 (i.e., the portions having radius R2) blend smoothly into the central portion 40 of threads 34 having radius R1. In this way there are no sharp edges or discontinuities between portions 38 and 40 to dig into nut threads 72 when nut 70 is rotated. Radius R2 is selected to cause jaw thread portions 38 to curve in away from nut threads 72 adjacent to end edges 36. In this way, when the above-mentioned friction-induced torque causes each jaw 30 to rotate about its longitudinal axis 32, this rotation is stopped by contact between relatively extensive surfaces in region 38 with surfaces of threads 72, rather than by contact between sharp end edges 36 and surfaces of threads 72. This prevents any portion of threads 34 from digging into threads 72, thereby promoting continuous smooth operation of the chuck. In addition, because the thread radius R2 affects all of the profile of the thread form, and because the thread form has some taper, the application of this invention necessarily results in a slight thinning of the thread at its end edges which promotes smooth meshing of the jaw thread faces (similar to thread faces 35 in FIG. 3) with opposing threads 72.

Although the circumferential extent and radius R2 of regions 38 can be varied somewhat, the choice of these parameters is limited by the following considerations: On the one hand, regions 38 should not be so circumferentially extensive or sharply curved that they do not cooperate with threads 72 to acceptably limit rotation of each jaw 30 about its longitudinal axis 32 when the jaw is subjected to the above-described friction-induced torque. In other words, if regions 38 are too wide (circumferentially of jaw 30) and/or have a radius R2 which is too small, regions 38 will not come into contact with threads 72 in the manner required to stop jaw rotation about axis 32 until an unacceptably large amount of such rotation has occurred. On the other hand, regions 38 must be sufficiently circumferentially extensive and have a small enough radius to ensure that end edges 36 cannot contact and dig into threads 72 when jaws 30 rotate about their longitudinal axes 32. The foregoing will make it readily apparent to those skilled in the art how the circumferential extent and radius R2 of regions 38 can be selected to fulfill the objectives of this invention without unacceptably increasing the rotation of jaws 30 about their longitudinal axes 32.

Figure 7:
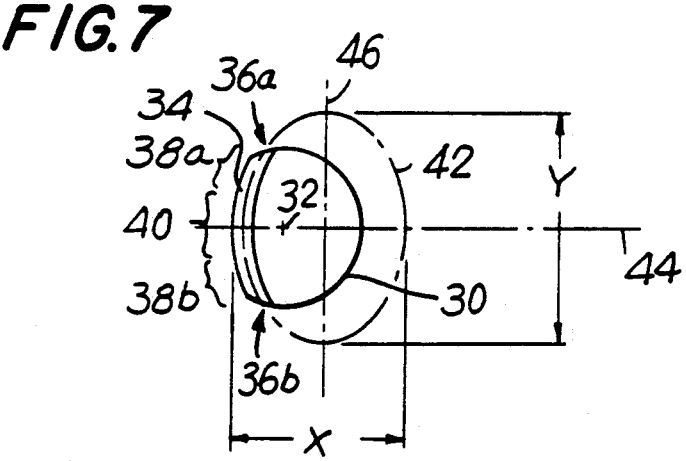
FIG. 7 is another view similar to FIG. 5 showing a second illustrative embodiment of this invention.

Although FIG. 6 shows the use of two discrete radii R1 and R2, threads 34 can be made with other curvature configurations such as more than two radii or a continuous change in radius in the circumferential direction. For example, FIG. 7 shows a jaw 30 having threads 34 which conform to an arc of an ellipse 42. Ellipse 42 is oriented so that its major axis 46 is substantially parallel to the threaded side of jaw 30. Accordingly, the curvature of the central portion 40 of threads 34 in FIG. 7 is relative gradual. But that curvature becomes increasingly sharp as one enters end edge regions 38. In other words, the radius of central portion 40 in FIG. 7 may be similar to R1 in FIG. 6, while that radius gradually decreases (toward values like R2 in FIG. 6) as one moves from the center toward and through regions 38.

Figure 8:
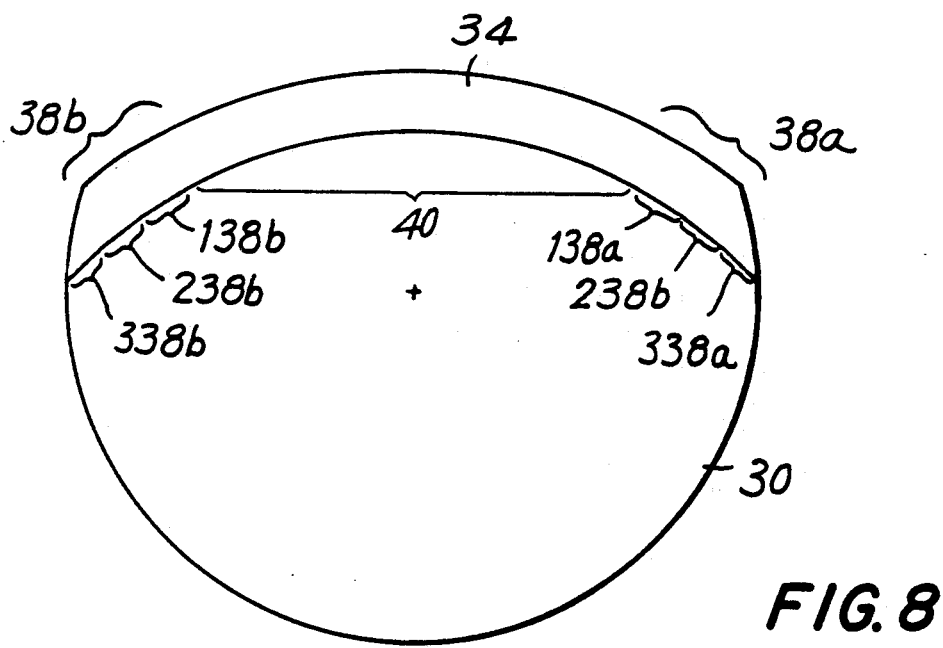
FIG. 8 is still another view similar to FIG. 5 showing a third illustrative embodiment of this invention.

Embodiments of the type shown in FIGS. 6 and 7 are especially preferred because there are no discontinuities in the jaw thread surfaces to dig into nut threads 72. However, it may be possible to approximate these jaw thread shapes with jaw thread shapes which do have small or relatively minor surface discontinuities without departing from the scope and spirit of this invention. For example, FIG. 8 is a greatly enlarged view of a jaw 30 in which the thread 34 has a central region 40 having a radius R1 (similar to region 40 in FIG. 6). Each end edge region 38, however, has several circumferentially adjacent subregions 138, 238, and 338, each of which is an adjacent, relatively short chord of a circular arc having radius R2 (similar to the radius R2 of regions 38 in FIG. 6). Accordingly, although each of subregions 138, 238, and 338 is straight, these subregions come very close to approximating a smooth circular arc of radius R2. There may thus be discontinuities between regions 40, 138, 238, and 338, but these discontinuities are relatively minor and do not produce edges which are likely to significantly dig into nut threads 72. Accordingly, even though regions 38 in FIG. 8 are made up of several flat or straight segments, they approximate curved surfaces and can therefore be said to have "curvature" as that term is employed herein and in the appended claims.

It will be apparent that the foregoing is only illustrative of the principles of this invention, and that various modifications can be made by those skilled in the art without departing from the scope and spirit of the invention. For example, although only two different radii R1 and R2 are shown in FIG. 6, it will be apparent that three or more different radii can be used if desired. Similarly, although both end edge regions 38 are treated similarly in FIGS. 6-8, it will be apparent that if only one end edge is causing a sufficiently serious adverse effect on chuck operation, only that end edge region may be modified in accordance with this invention, while the other end edge is left unmodified.

The invention claimed is:

1. In a chuck having (1) a main body having a longitudinal axis, (2) a plurality of longitudinal jaws disposed in said main body and spaced around the longitudinal axis of said main body, each of said jaws having a longitudinal axis which is inclined relative to the longitudinal axis of said main body, and (3) a nut mounted on said main body for rotation relative to said main body about the longitudinal axis of said main body, said nut being threadedly engaged with thread segments on each of said jaws for causing each of said jaws to move relative to said main body parallel to the longitudinal axis of said jaw when said nut is rotated relative to said main body, the thread segments on each of said jaws extending transverse to the longitudinal axis of said jaw from a first end edge to a second end edge and having a first portion intermediate said end edges which is curved to substantially conform to the thread on said nut, the improvement comprising:

a second portion of said thread segments on each of said jaws, said second portion extending from one of said end edges to said first portion and having curvature which is in the same direction as but greater than the curvature of said first portion.

2. The chuck defined in claim 1 wherein the surface of said thread segments continues with no discontinuities from said first portion into said second portion.

3. The chuck defined in claim 1 wherein said second portion extends from said first end edge to said first portion, and wherein said improvement further comprises:

a third portion of said thread segments on each of said jaws, said third portion extending from said second end edge to said first portion and having curvature which is in the same direction as but greater than the curvature of said first portion.

4. The chuck defined in claim 1 wherein the curvature of said first portion is an arc of a first circle having a first relatively large radius, and wherein the curvature of said second portion is an arc of a second circle having a second relatively small radius.

5. The chuck defined in claim 4 wherein said first and second circles have a common tangent at the point where said first and second portions meet one another.

6. The chuck defined in claim 1 wherein the curvature of said first portion is a first arc of an ellipse and the curvature of said second portion is a second arc of said ellipse, said first arc being curved more gradually than said second arc, and said first and second arcs being adjacent subarcs of a third arc of said ellipse.

* * * * *